United States Patent
Kerber et al.

[11] Patent Number: 5,957,073
[45] Date of Patent: Sep. 28, 1999

[54] LAMINATED LOOP DAMPENING AND SHIELD STRUCTURE

[75] Inventors: Dennis P. Kerber, Bothell; Gregory J. Armfield, Redmond, both of Wash.

[73] Assignee: Schuyler Rubber Company, Inc., Woodinville, Wash.

[21] Appl. No.: 08/887,515

[22] Filed: Jul. 3, 1997

[51] Int. Cl.⁶ .................................................. B63B 59/02
[52] U.S. Cl. ........................................................ 114/219
[58] Field of Search ............................ 114/219; 405/212, 405/215

[56] References Cited

U.S. PATENT DOCUMENTS

| | | | |
|---|---|---|---|
| 1,981,182 | 11/1934 | Lyons | 114/219 |
| 2,874,669 | 2/1959 | Norman | 114/219 |
| 3,063,399 | 11/1962 | Schuyler | 114/219 |
| 3,107,642 | 10/1963 | Lakin | 114/219 |
| 3,338,206 | 8/1967 | Motter | 114/219 |
| 3,353,812 | 11/1967 | Miller | 267/1 |
| 3,498,251 | 3/1970 | Dean | 114/219 |
| 3,693,572 | 9/1972 | Crook | 114/219 |
| 3,788,082 | 1/1974 | Narabu | 61/48 |
| 3,975,916 | 8/1976 | Watson | 61/48 |
| 4,057,141 | 11/1977 | Laurie et al. | 114/219 |
| 4,357,891 | 11/1982 | Sluys | 114/219 |

*Primary Examiner*—Gary C. Hoge
*Attorney, Agent, or Firm*—Patrick M. Dwyer

[57] ABSTRACT

A dampening and shield structure such as a fender with a plurality of resilient laminated bumpers. A plurality of these bumpers each have a two or more elastic laminae or layers. In each such multiple layer bumper, at least one of the lamina is folded to enclose at least one other lamina, so that the folded laminae and any laminae they enclose form a laminated loop. Alternate embodiments have a bumper loop that has at least one lamina that is not folded. Some embodiments have substantially different length laminae folded into a laminated loop such that there are definite spaces between one or more adjacent pairs of lamina. The number of laminae comprising the laminated loops can vary. Another embodiment is a mechanically floating fender flexibly mounted to elastically intercede during a collision. The floating fender has a plurality of bumpers which may be single layer or laminated, and the bumper loops are oriented to be continually in contact with the structure on which the fender is mounted. The floating mounting is effected by connecting the fender to the mounting structure (such as a boat hull) with lengths of some flexible connecting material such as chain.

11 Claims, 7 Drawing Sheets

LAMINATED LOOP DAMPENING AND SHIELD STRUCTURE

TECHNICAL FIELD

The invention relates to dampening and shield structures for both fixed and movable structures such as tugboats, other ships, trucks, loading docks, parking garages, piers, offshore drilling rigs, mooring dolphins, lock walls and mitre gates, and other objects and structures prone to contact or collision with or by other structures, and to means for abating damage that might otherwise be sustained by such objects in collision. More particularly, the invention relates to a laminated loop dampening and shield structure.

BACKGROUND OF THE INVENTION

Ships and barges, and the marine structures built to accommodate them, typically weigh many thousands of tons, even when not loaded with freight or other cargo, and the ships move at speeds often in excess of 20 knots. Yet they are typically fabricated of steel plates less than a quarter of an inch thick. They have all increased considerably in size and power over just the last six years. A new breed of ship docking modules, tractor tugs and reverse tractor tugs being built have increased horsepower, increased maneuverability (due in part to the 360 degree rotatable propeller and the Voith Schneider "Beater" propulsion technology), and increased thrust.

The days of conventional tugs with one or two fixed propellers are closing, leaving this antiquated design relatively ineffective in today's market because they cannot be multifunctional. The new tugs on the other hand are considerably more expensive than their predecessors, and they must work more for their owners to make money. The tugs work more by being more versatile. For example, the new breed of tug must be able to perform ship assist, barge tendering, piloting, and logging functions. The increased horsepower, maneuverability and thrust allow these tugs to do all of that.

As tugs, barges and ships increase in size, so do the onshore marine structures which provide berthing. More sophisticated renderings are required on these structures in order to provide safe operation and maximum performance. Similarly, trailers for large trucks typically weigh many thousands of pounds and move at speeds upward of seventy miles per hour, but are made of aluminum sheet less than one tenth of an inch thick. Tugboats have thick, reinforced bows and sterns, and loading docks are generally made of solid, steel-reinforced concrete. The size and weight of automobiles, and the kinetic energy involved in their movement, are correspondingly large, while support columns in parking garages are for all practical purposes rigid, yet at the same time brittle. Thus for many years designers have struggled with the problem of dissipating the forces and energies associated with the impact and rubbing of large, relatively thin-skinned, generally moving structures against relatively solid or monolithic obstacles. Among the difficulties encountered have been the stiffness, weight, cost, durability, and energy-absorption, or dampening, capacities of available designs.

Several approaches to the problems outlined above have appeared. For years fenders fabricated from filled rope bundles have been used on tugboats, with some success. Improved performance has been provided by such fenders as, for example, built-up composite bow bumpers for tugs and other boats, fabricated of rubber or similar materials. Such bumpers have given adequate service under a wide variety of conditions. Still other suggestions have included the use of bagged buoyant materials, the use of entire automobile tires lashed or mounted in place on the collision-bearing surface, and whole circumferential sections of automotive tires strung together on blocks or trussed together with auxiliary structure and fasteners in something like the manner of teeth on an old necklace. However, each of these solutions has to some degree fallen short of the requirement for a selectably soft, durable, simple, inexpensive, and highly adaptable general use fender.

The built-up rubber composite bumper of U.S. Pat. No. 3,063,399 to Schuyler (the text of which is hereby incorporated by reference as if fully set forth) has been found to be relatively stiff in some applications, and in some instances to have prevented less damage than might have been desired. Furthermore, the physical properties (such as deflection under load and energy absorption) are relatively static because the construction method cannot be altered to engineer a broad range of deflection and energy absorption values for the many varying circumstances in which such devices will be employed. Conventional composite fender constructions also exhibit a rather low coefficient of friction, notwithstanding the Schuyler '399 patent's disclosure of a kind of "squeegee" action. Such low friction is generally undesirable in situations where holding ability, or "stiction", as the term is generally known in the art, is preferred and even sometimes required for safe and efficient operation.

One proposed solution to the problem has been the Schuyler Rubber Company Model SR3D fender. The Schuyler SR3D utilizes built-up aggregations of same size, single-ply rubber bumper loops to increase fender softness. Holding ability in some applications has been increased as well. Holding ability, or "stiction", which is frequently desired in contacts such as those experienced by tugboats pushing on ships or barges, is generally taken in the fender industry to mean resistance to a tangential component of the pushing force, such as that imparted by a tugboat pushing inward and forward on a ship or barge. However, the single ply loops of the SR3D have proved too soft for some applications, and have in some situations shown disappointingly short durability and fatigue lives. That is, they give, or deflect, in relatively large amounts upon initial, relatively light loading, and then "bottom out" suddenly when the single ply loops have fully deformed (colloquially, one might say when they were fully "squashed") onto the relatively harder fender base and spacer materials. They have also shown a tendency to tear or break, either in mid-loop or at the base, under relatively moderate shearing loads, or at the base under repeated full deformations. The use of same size loops similarly limits design variability in creating shield and dampening structures such as marine fenders.

The single ply of the SR3D loops also does not allow one to engineer a fender or series of fenders to exhibit the varying degrees of load deflection, energy absorption, and "stiction" required of the majority of current fendering applications. The SR3D also does not allow the gaps between a series of fenders to be eliminated as desired, where it is generally preferred to have no gap at all in such a series.

At the same time, the world has become subject in recent years to increasingly harsh requirements for the efficient utilization of resources. Landfills are becoming huge, seemingly insolvable environmental blights, the pollution caused by the chemical processes associated with the production of thousands of items costs billions of dollars each year to mitigate, and the waterways of the world are being filled with trash and poisons. In particular, chemical processes used in the production of metals and polymers such as those used in automobile tires have been seen as damaging, and disposal of the automobile tires (and the like) themselves, once they have been used and discarded, has become a difficulty of its own peculiar dimension. Hundreds of millions of tires are discarded each year in the United States alone. Landfills, already filled to overflowing, have refused to accept more of them; and special tire dumps, filled with millions of discarded tires, have spontaneously combusted and burned for months in fires so hot and dangerous as to defy control by any reasonable firefighting techniques. And tires do not biodegrade.

Thus there are independent needs for a selectably soft (or stiff), engineerable, durable, simple, inexpensive, and highly adaptable general use fender having good holding ability and not prone to tearing or base failure under shear or repeated direct loads; and efficient, cost effective ways of reusing discarded materials, in particular used truck and bus tires. There thus exists a definite need for a new fendering system that will: provide more cushion than would be available from the solid laminated, extruded, or molded rubber products currently available; provide greater and selectably greater stiffness and rigidity than the Schuyler SR3D; provide more durability than the Schuyler SR3D so that the longer useful life of the new fender system makes it more economical, durabilities approaching and even exceeding the solid laminated models now in use; and provide an engineerable system to achieve variable and selectable degrees of softness, durability, and stiction.

DISCLOSURE OF THE INVENTION

Accordingly, it is an object of the invention to provide a selectably soft (or stiff), durable, simple, inexpensive, and highly adaptable general use fender for vehicles, structures, and other objects subject to contact or collision with other structures or objects, including ships, tugboats, trucks, loading docks, parking garages, and the like.

It is a further object of the invention to provide a laminated bumper loop having superior holding ability and resistance or durability under shear loadings, and reduced susceptibility to loop or base failure due to repeated maximum deformations.

It is a further object of the invention to provide a mechanically floatingly mounted fender capable of relatively simple replacement and of adaptation to a wide variety of uses and conditions in a single structural application.

It is a further object of the invention to provide an efficient, cost effective way of reusing discarded materials, and in particular of using used truck and bus tires, and of using such materials in the fabrication of structure and vehicle fenders.

It is yet another object of the invention to provide a fendering material which can be engineered in a manner so that certain fenders within a fendering system exhibit varying degrees of elasticity, durability and stiction, as required by a particular application, and which may be used to provide selectably soft (or stiff), engineerable, durable, simple, inexpensive, and highly adaptable general use fenders having good holding ability and not prone to tearing or base failure under shear or repeated direct loads.

It is a another object of the invention to provide a fendering system that can reliably eliminate gaps between individual fender units.

It is a further object of the invention to provide a fendering material that can accommodate and absorb the use of larger and stronger metal hangers and weld tabs.

It is a further object to provide any or all of the above objects in a single fender.

These and such other objects of the invention as will become evident from the disclosure below are met by the invention disclosed herein.

The invention addresses and provides such a system. The invention represents a selectably soft (or stiff), durable, simple, inexpensive, and highly adaptable general use dampening and/or shield structure, or fender, for vehicles and structures such as ships, tugboats, trucks, loading docks, parking garages, airport jet gates, and the like, capable of being fabricated from the least expensive and most environmentally challenging of recyclables. The invention also provides selectably improved holding ability in such structures and fenders.

The invention provides laminated loop dampening and shield structures for both fixed and movable structures such as tugboats, other ships, trucks, loading docks, parking garages, piers, offshore drilling rigs, mooring dolphins, lock walls and mitre gates, and other objects and structures prone to contact or collision with or by other structures, and means for abating damage that might otherwise be sustained by such objects in collision, including a dampening or shield structure, or fender, that has selectable overall elastic or dampening and durability characteristics, and is simple, inexpensive, and highly adaptable. Devices according to the invention preferably have multiple ply elastic bumper loops fabricated from sections of foldable elastic material, such as recycled tire casings, spaced at selectable intervals. Some preferred embodiments of the invention provide mechanically floating mountings.

In one embodiment the invention is a new fender in which a plurality of resilient bumpers are stacked together. A plurality of these bumpers each have a two or more elastic laminae or layers. In each such multiple layer bumper, at least one of the lamina is folded to enclose at least one other lamina, so that the folded laminae and any laminae they enclose form a laminated loop. Each loop may be thought of as having a bumper loop portion and a loop end portion, and each loop is restrained at its loop end in a fender base.

Preferably, an inner lamina (in a stack of laminae, the lamina which is folded into the interior of the loop may be thought of as the inner lamina) is folded upon itself such that its inner surfaces come into contact with each other in the loop end. Thus the loop ends are not spaced apart by any intervening spacing materials, whereas at the same time, respective loop ends are preferably restrained themselves in the fender base between such spacers. Generally, the bumper loops are the parts of the bumpers that project beyond the fender base, and appear generally loop shaped, and adjacent loops are spaced such that some bumper loops are in contact with each other when these bumpers loops are unloaded.

Some alternate embodiments may employ a bumper loop that has at least one lamina that is not folded, and in such embodiments a bumper end (the end toward the outermost tip of the bumper loop) of the lamina not folded is in substantial contact with an inner surface of a folded lamina that makes up part of the bumper loop. For some purposes, close proximity of the bumper end to the inner part of the bumper loop will be advantageous, rather than substantial contact.

In embodiments where a bumper loop comprises a plurality of adjacent (stacked) laminae, all the laminae are generally substantially the same length (with permissible variation to compensate for the different folded (as opposed to unfolded) lengths of inner and outer laminae), and are folded together into a laminated loop wherein each lamina is substantially entirely in contact with its adjacent lamina. That is all lamina that were in contact with each other in the prefolded stack, remain so in contact, and without substantial gaps between them. Other embodiments are contemplated however where substantially different length laminae are folded into a laminated loop such that there are definite spaces between one or more adjacent pairs of lamina.

In some embodiments, the number of laminae comprising the laminated loops will vary amongst the bumpers, so for instance, some bumpers may have only one or two layers, while others may have three or more layers.

Some alternate embodiments are contemplated with bumper loops that are differentially oriented from other bumper loops, either by incremental angular deviations one from the other, or where some loops are disposed oppositely to other bumper loops.

Another embodiment is a mechanically floating fender flexibly mounted on a first structure so as to elastically intercede during a collision between the first structure and a second structure. Preferred embodiments of the floating fender have a plurality of bumpers, where each bumper may be single layer or laminated, but a plurality of the bumper loops are so oriented as to be continually in contact with the first structure, rather than facing away from the structure on which the fender is mounted. In this embodiment, some or all of the more resilient bumper loops are generally facing inward. In preferred embodiments of this alternate, the flexible and floating mounting is effected by connecting the fender to the mounting structure (such as a boat hull) with lengths of some flexible connecting material such as chain. Depending on how the fender is attached with the chain(s) to the hull or other structure, the chains may or may not be in tension, and such tension may in part be provided by partial compression of some or all of the bumper loops of the floating fender as they are pressed against the structure during the mounting process.

BEST MODE OF CARRYING OUT THE INVENTION

Figure 1:
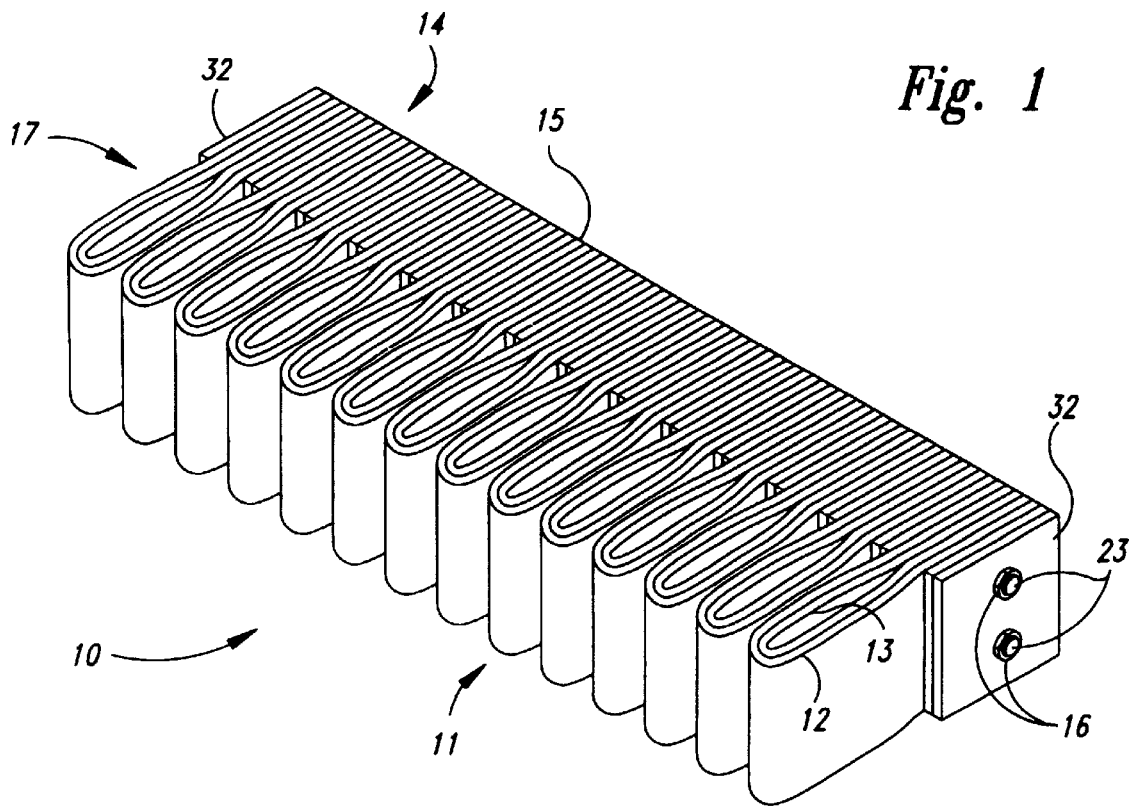
FIG. 1 is a front perspective view of an embodiment of the fender aspect of the invention.

Throughout this disclosure the terms "ply" and "lamina" are used interchangeably to mean "layer" when discussing build-up of multiple-layer (multi-ply) or laminated loop bumpers comprising a number of laminae. A piece of elastic material, generally suitable for use as a foldable lamina in this invention, and preferably of the same material as the folded laminae, but which is not itself folded, is still considered a ply or lamina when enclosed or sandwiched between the ends of a folded loop.

The new laminated loop system of the invention provides for each of the objects of the invention because the physical traits of a single fender unit or an entire fendering system can be varied both homogeneously and heterogeneously in the system. That is, during design and construction, either within a single fender unit, or across an entire unit or units, the number of loops in a fender unit can be increased or decreased, the length of the loop(s) may be varied, and the number of plies or laminae of elastic foldable material may be varied.

For example, the stern area of a new tractor tug would need a much stiffer cushion, maximum durability, and maximum stiction, because this is the area where ship and barge assist would be concentrated. As a result, this fender would have longer loops, and more loops within loops. Side fenders are generally softer than those at the stern if the tug is performing piloting duties, but have to be more durable (not less) because of the severe up and down relative sea motions of the tug and ship as the tug made contact with the ship during pilot transfer. Shorter laminated loops can be used to advantage in this application. On the other hand, harder side fenders with decreased stiction are needed by a ship assist tug performing barge work. A fender with a greater proportion of shorter single loops admixed can be used to advantage in such an application. Generally, softness increases and stiffness and durability decrease as the length of the loop depending or projecting from the relatively more solid rubber base is increased. The single looped SR3D is to at least some extent ineffective in this regard. The reason is that as the length of the loop is increased, the chance of it being pulled out from the fender base increases considerably, especially in severe up and down movement.

The fender units of the invention make it possible to minimize or eliminate any gaps between fender sections. Such gaps are the plague of conventional fender materials. A gap in any fendering system is a weak point, so it is preferred that there be no gaps. Gaps occur in conventional fender systems where fender units join. The "gap" is an area of relatively less resiliency, or outright empty space, caused by the metal hardware at the end of each unit. Generally because laminated loops at the end of a fender unit of the invention extend their bumper loop portions out over the end of the unit, two abutting units also have abutting bumper loops, thereby effectively minimizing or eliminating any "gap". This is even more so, where, by design, several bumper loops are spaced relatively close together at a fender end, so that the end bumper loop is even more biased out over the end because of the relative crowding and pressure of its neighboring loops. Two such units abutted will effectively have no gap at all.

In addition, the system of the invention allows the use of a larger "backstop". The distance from the side of the fender unit away from the bumper loops to the centerline of the steel rod(s) onto which the laminated rubber sections are compressed during the manufacturing process is referred to as the "backstop". The conventional backstop on solid laminated fender units and on the Schuyler SR3D is 2.5 to 3.5 inches. In other words, the steel rods are closer to the "back" side of the fender than to the "front" side of the fender, so there is more rubber cushion at the front (impact) side than the back side. Because a fender is effective only to the extent that unwanted metal to metal contact is eliminated, a larger (say 5.5 inches) backstop in a conventional fender would increase the chance of metal to metal contact upon impact, because there would then be not enough rubber on the impact side of the fender to keep it from happening.

On the other hand, with the smaller backstop, single layer loops are more easily pulled out, as may readily be appreciated. In order to minimize this, the length of loops in SR3D single loop fenders are limited because smaller single loops are more durable than longer single loops. Even with increased backstop in an otherwise conventional fender, the single layer loops themselves are sometimes not sufficiently stiff to prevent metal to metal contact.

A laminated loop structure does allow adequate stiffness and "soft mass" (the mass of the relatively softer bumper loop portion) to increase the backstop to 5.5 inches or more. Loop failures due to loop pull out are thus decreased. Loop length within the loop can then also be increased without compromising durability.

The invention also allows for the use of larger hangers. Since metal to metal contact is to be avoided in fendering design, hangers for conventional fendering are limited in size and shape so that no expected "crush" on impact will put hanger metal into contact with the impacting structure. The "hanger" is the metal angle used to attach the fender to a structure, usually by welding, as is known to those skilled in the art. The bigger and stronger the hangers the better the fendering works, in general, and the longer it wears. Hangers for the fendering of the invention may be larger and stronger than those of conventional fenders because the increased stiffness and soft mass of the invention place more rubber between the object being pushed and the outside edges of the hanger structure. Thus fenders according to the invention can be hung in areas where conventional fenders cannot be reliably hung.

One aspect of the invention is a fender with one or more spaced-apart bumpers, each bumper having a plurality of foldable elastic laminae. By spaced-apart is meant that the respective bumpers are separated in the fender base by the presence between them of one or more layers of fender base material other than bumpers. Preferably this material is simply non-folded pieces of the same material from which the bumpers are made, such as used tire casings. The elastic laminae are generally folded in such a manner as to form a laminated bumper loop. Preferred embodiments of this fender aspect of the invention incorporate a generally uniform series of such bumpers, more or less evenly spaced and mounted or suspended together as fenders on or near those portions of a structure prone to contact or collision with other objects. The fenders are disposed, as will be appreciated by those skilled in the art, on or about the structures in such manner as to intercede between the structures and colliding or contacting objects during contact or collision, and to elastically absorb, spread, and otherwise dissipate the energy associated with the collision which might otherwise be expended in deforming or damaging one or another of the structures or colliding objects. (As used herein, "collision" means any contact between any two structures, vehicles, or other objects resulting from any relative motion between them.)

Another aspect of the invention is the laminated bumper itself. Generally preferred embodiments of the bumper aspect of the invention comprise at least two or more elastic layers or laminae, folded as described into bumper loops, and secured to form, in cooperation with other bumpers, a fender. Other generally preferred embodiments comprise one or more unfolded, "straight" laminae enclosed and cantilevered or secured within the loop formed by one or more folded laminae such that the free end(s) of the unfolded lamina(e) provide support to the loops formed by the folded laminae when the loops are deformed, as by a contacting load. By "foldable elastic laminae" are meant any elastic strips suitable for fashioning into bumper loops as herein described, and for working in cooperation with other strips to do so, and composed of material of suitable elasticity and resilience to absorb sufficient amounts of energy to serve satisfactorily with or as part of the invention, such as used tire casings.

In preferred configurations bumper loops are disposed such that during contact or collision between objects or structures the loops make contact with one or both of the structures and, as the structures move closer together, the loops deform, using the elastic energy storage potential of their laminae to absorb the energy associated with the contact. To this end it has been found advantageous to wrap or fold the laminae tightly, so that they lend each other support under all manner of deformations—shear, compression, tension, or bending. Thus while loops that are folded such that gaps or spaces between the folded laminae exist (either throughout the lay-up or at certain points only) may be employed to advantage in some circumstances, preferred embodiments will generally comprise tightly-folded laminae (having no gaps between them) capable of supporting each other under a wide variety of conditions.

Generally preferred embodiments of the fender aspect of the invention comprise a plurality of bumpers, each spaced more or less uniformly from its fellows, so that the "stack-up" of a given fender might include a spacer, a bumper, a spacer, a bumper, and so on, in repeating cycles, all in place on a binder rod and capped with plates and retaining nut. However, it is also expected that other advantageous stackup arrangements may be employed. For example, a fender might be formed by groups of bumpers placed together without intervening spacers. In some instances, proportionately large numbers of bumpers might be grouped together without intervening spacers. Spacing may also be accomplished by using loops of differing lengths, so that some loops protrude farther from their bases than others, thus for example alleviating loop-crowding at selected points on the fender. It is further anticipated that many embodiments will use as spacers unfolded or unlooped segments or layers of the same material used to fabricate the bumper loops, or similar material. Some embodiments may incorporate spacers disposed between the folded ends of one or more of the bumper loops—that is, within the loop, in such manner as to space the folded ends of the loop laminae apart, so that the ends of such loop(s) are not directly in contact with one another.

In embodiments of the invention incorporating aggregations of bumpers and/or spacers, that portion of the fender comprised of the extremities, or loop ends, of the bumper loops and the spacers is referred to as the fender base. Due to the generally tight or secure "stack-up" of bumper loop ends and spacers in the fender base, this portion of the fender, from which the bumper loops generally depend or extend, forms a relatively much stiffer part of the fender than do the loops. The fender base however nonetheless aids in support and dissipation of loads during contact or collisions of structures or other objects as herein described. The fender base, also sometimes referred to as backstop or fender backstop, is the part of the fender through which the structural rods pass whereby the base may be generally tightly or securely packed, bound, or fastened together.

Preferred bumper loops according to the invention are generally produced without auxiliary structures or support attached, and are typically supported only at or within the folded base of their laminae. By this it is meant in part that in preferred embodiments the laminae of the bumper loops have loop ends with prepunched alignment holes, and the laminae are folded such that the loop ends contact each other, or contact intermediate spacers; and the holes in the loop ends are successfully pushed onto convention retainer rods, and are restrained by or between adjacent bumper loops and/or spacers. The friction existing between the loop ends of the laminae of such an embodiment of the invention and any adjacent spacers may be, and often is, substantial, and serves to keep the bumper from rotating relative to the remaining bumpers or the fender. Thus in preferred embodiments individual bumpers are not anti-rotationally fastened directly to any structure, other than the rods.

In some embodiments of the fender aspect of the invention the bumper loops depend from the fender, often as described above, and adjacent loops are spaced, taking into account the materials from which they are composed, such that the loops are in contact with each other when the loops are unloaded. Virtually any material of finite thickness will, when folded into a loop and not loaded in the loop portion by any external loads (as for instance a point load produced by contact with any rigid or semi-rigid surface), have some residual curvature or bow, and will not merely fold flatly back onto itself, as might be considered to happen to a very thin, creased piece of paper. Thus, if a loop of such material is folded and made into a composite in the manner described above, comprising two or more loops, with or without intervening spacers, it may be spaced from its neighbor(s) such that the curved or bowed portions of the loops contact each other when the loops are unloaded. Again, for such a loop to be "unloaded" means that it has no forces or deformations externally imposed on it in the loop area.

Some preferred embodiments of the invention comprise bumper loops having varying numbers of laminae. For example, a fender constructed according to the invention might include bumper loops having, in various combinations and locations, 2, 3, 4, or even more loops, consistent with the materials used and the requirements of the application. It is also possible that one or more of the loops comprised in such a fender might be made of only one lamina—that is, they might be single-ply loops. It is further possible that any one or more of the loops might incorporate lamina of varying thicknesses. Thus although preferred embodiments of the fender aspect of the invention typically comprise bumpers having uniform ply-thicknesses, and perhaps even uniform numbers of plies or laminae, it is contemplated that either the thickness or the number of plies employed might vary among the number of bumper loops. It is further believed that any such loops or bumpers might be interspersed within or used by a fender according to the invention without departing from the scope of the invention. An advantage to be derived from variations in the number and thickness of laminae used in the various loops of the fender is that a great deal of control may be exercised over the stiffness and energy-absorbing characteristics of the fender as a whole. It is also desirable in some embodiments of the invention that bumpers incorporate one or more unfolded laminae sandwiched between ends of folded laminae and configured so as to give support, by means of their free ends, to the folded laminae when the folded laminae are deformed under load.

In another aspect of the invention, as an alternative to rigid attachment of a fender to a structure, any of the fender embodiments described above may be mechanically floatingly mounted to some portion of a structure so as to provide elastic energy-absorption capacity in contact or collision, as described. That is, the fender is held in contact with the structure in such a manner that when the fender is unloaded, in the sense that it is not subject to contact by any external objects or forces, neither its base nor its loops are so far distended from their unloaded configurations as to have reduced their usefulness in absorbing energy in collisions substantially or disproportionately reduced. At the same time, however, the fender as a whole is in such embodiments restrained such that it is not generally free to move or swing relative to the structure. The first substantial deformation in a fender suspended in such fashion would in general occur when the fender is loaded, as by contact or collision of the structure with another structure or object. Most of the initial deformation would occur in the bumper loops, although increasing loads would cause lesser deformations to occur in other portions of the fender, and eventually when the loops were fully deformed further deformation would take place in stiffer portions of the fender, as for example in the loop ends and even the spacers incorporated into the fender base. Fenders according to this alternate aspect of the invention may advantageously be mounted with their bumper loops positioned inwardly toward the structure upon which they are mounted.

It is also contemplated that various embodiments of the fender aspects of the invention will comprise bumper loops, incorporated into the fender in any of the manners described above, which are oriented differently from other loops in the fender. For example, if some of the bumper loops are fashioned from rubber strips in the manner previously described, they might be oriented with varying alignments of their loop ends, so as to provide protection to the structure or object they are meant to protect from forces applied from a variety of angles. In some embodiments, such bumper loops may be oriented oppositely to each other, to provide the relatively soft initial contact of the bumper loops to structures or objects on both sides of the fender.

One of the objects of the invention, as described above, is to conserve the nation's and the world's resources, and the environment, by making the fullest possible use in the invention of recycled materials. Any form of suitably tough, weather resistant, noncorrosive, strong used elastic materials might serve, such as used silicone rubbers, firehoses, nylon mattings, or belting, and especially used automotive tires of all types, including truck, bus, and heavy equipment tires. Any such materials might be cut into suitably sized and shaped strips, holed, stacked, folded together, and fastened with spacers in the manner outlined above and as more particularly set forth in the Schuyler '399 patent. Moreover, additional strips of the same material might be used for spacers. As will be appreciated by those skilled in the art, any tires of various type and size might be made to work advantageously within the same fender to vary or control bumper loop length, thickness, and stiffness, with, if desired, tailored stiffness, elastic, and durability characteristics for the fender as a whole.

Turning now to the drawings, the invention will be described in a preferred embodiment by reference to the numerals of the drawing figures wherein like numbers indicate like parts.

Figure 2:
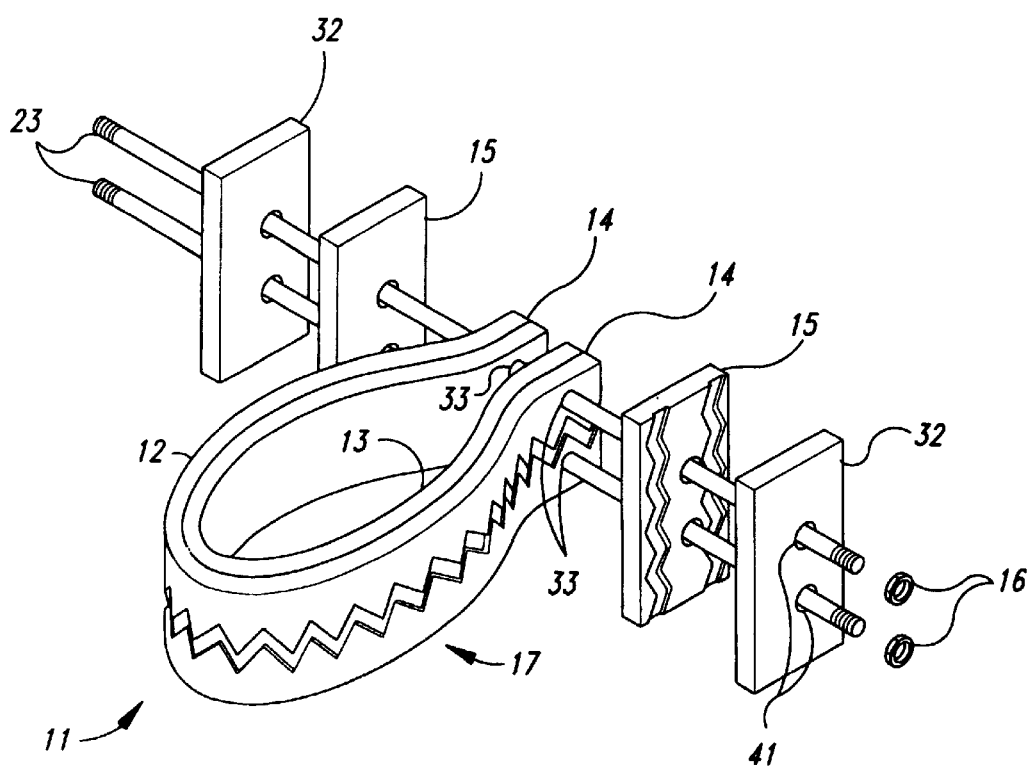
FIG. 2 is an exploded perspective view of an embodiment of the bumper aspect of the invention.

FIG. 1 is a front perspective view of an embodiment of the fender aspect of the invention, and FIG. 2 is an exploded perspective of a single bumper 11 from fender 10. Fender 10 comprises a plurality of spaced-apart bumpers 11, each of which comprises a plurality of foldable elastic laminae 12 and 13 folded to form laminated bumper 11. Bumper 11 has bumper loop 17 and loop ends 14. Laminae 12 and 13 have been folded such that loop ends 14 are aligned with each other, and the inner surfaces of lamina 13 are in contact with each other at the loop ends 14; loop ends 14 are restrained by and between adjacent spacers 15. Nuts or other fastener heads 16 are screwed onto binder rods 23 (shown in broken line in FIG. 3) through holes 33 in loop ends 14 to hold the fender together. Plates (or hangers) 32 further support bumpers 11 and spacers 15 in forming fender 10, and provide compression and help prevent galling or chafing of the bumpers and spacers by nuts or fasteners 16 or any associated washers, as will be appreciated by those skilled in the art. They may also provide anchoring for mounting fixtures employed to mount fender 10 on a structure to be protected, and may be as large as 8" by 8". Multiple fenders of the type illustrated in FIG. 1 may be arranged and secured in a vertical bank so as to provide a deeper fender, such as is shown in FIG. 5. A preferred fender base thickness is 11 inches, with bumper loop heights ranging between 6" and 8". Although a preferred material for the fabrication of laminae 12 and 13 is recycled automotive tires (typically cut-out sections of the tire tread are used, as shown), loops might be fabricated from any materials having satisfactory strength, durability, and corrosion- or weather-resistant properties. The particular properties required for any particular application will depend upon the application; but factors affecting selection of suitable materials will known to those of ordinary skill in the art of fender design.

Figure 3:
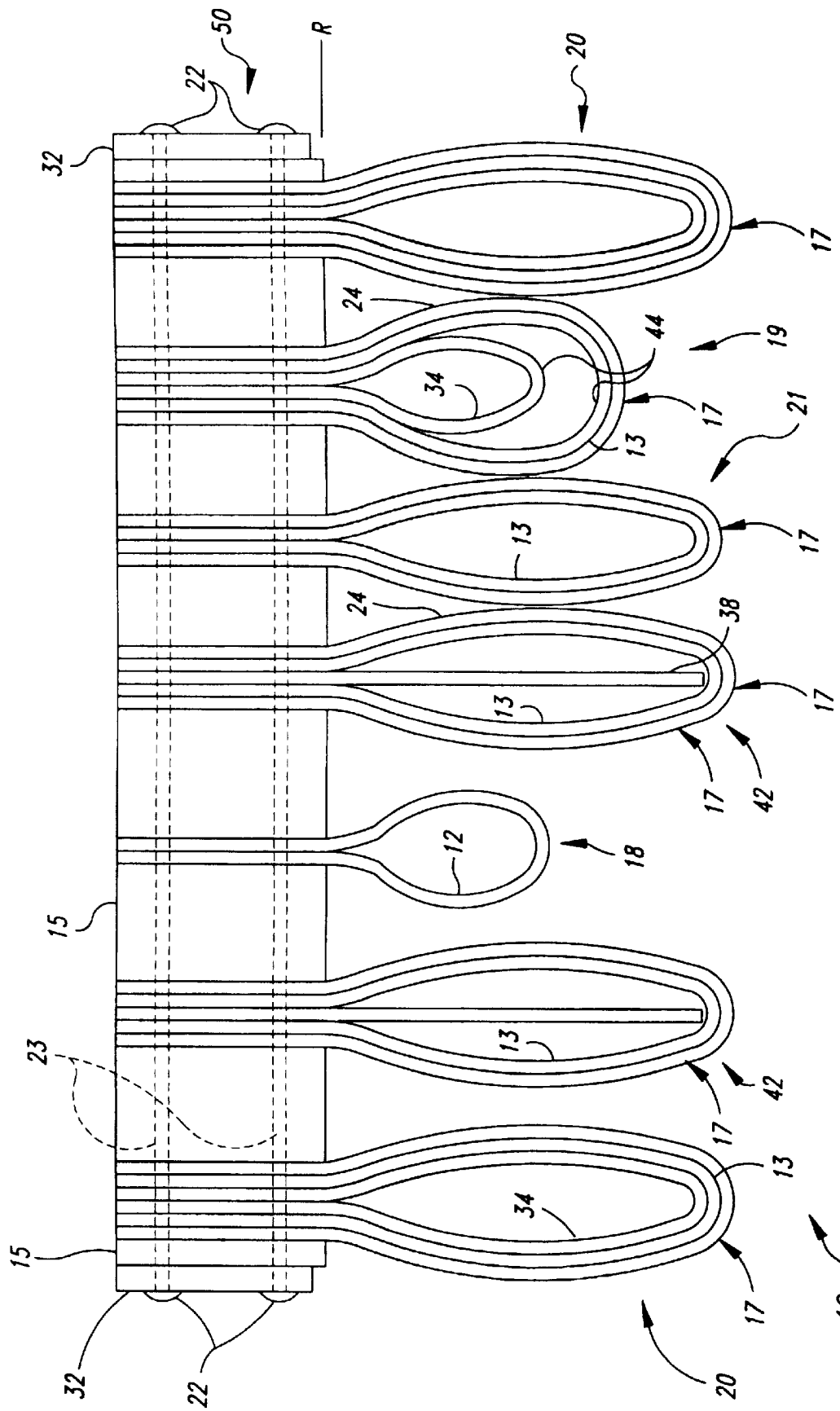
FIG. 3 is a top view of an embodiment of the fender aspect of the invention.

FIG. 3 is a top view of an embodiment of the fender aspect of the invention. Bumper loops 17 are formed from laminae 12, 13, (and optionally 34 and 38) as described above, and folded, sandwiched, and restrained between spacers 15. Some bumpers 42 are optionally formed by folding laminae 12 and 13 as described above, with unfolded or straight lamina 38 sandwiched between loop ends 14 of laminae 12 and 13 in such manner that the free ends of laminae 38 may support laminae 12 and 13 when bumper loops 17 are deformed under load. Bumper 19 includes one "short folded" lamina, which has been left shorter than the remaining laminae and folded such that gap 44 appears between laminae. Configurations of this type, comprising unfolded laminae and/or "short folded" loops, provide additional possibilities for tailoring the elasticity, resilience, and energy absorption characteristics of bumpers 11 and fenders 10. Binder rods 23, when capped by fasteners 22, such as rivet heads, fasten the bumper-spacer assembly together. Binder rods 23 may be fashioned from threaded steel, rebar, or any other material having sufficient strength, durability, and corrosion-resistant properties for the purpose, including, for some applications, nylon line or even manila rope.

The tension to be induced in binder rods or other binders will depend to a very great degree on the use to which the fender is to be put, the environment in which it is to be used, and the materials from which the fender, and particularly the bumper loops, are fabricated. The selection of a proper binding tension will lie well within the understanding of one having ordinary skill in the art.

It may also be seen in FIG. 3 that bumper loops of various sizes and numbers of laminae may be used to advantage in the invention. Bumpers 19, 20, and 42 comprise three laminae, while bumper 21 comprises two. Bumper 18 comprises only one lamina. Moreover, bumpers 18 and 19 are shorter in length than bumpers 20 and 21. It will be appreciated that many particular combinations of length, number of plies, and spacing of bumpers 17–21 may be used to advantage in different situations. Great control over the stiffness and durability of the fender may be exercised by varying these parameters. The portion of fender 10 formed by spacers 15 and loop ends 14, sandwiched between plates 32 (alternatively, those portions of the fender above reference R in the Figure), is fender base 50. It may be seen that bumper loops 17 depend or project from fender base 50, and that when any one or more of bumper loops 17 have been fully deformed, as by contact with some object or structure, fender base 50, and in particular spacers 15 and loop ends 14, will, if suitably supported, continue to absorb load or dissipate energy imparted in such contact. This may also be seen by reference to FIG. 4, in which fender 10 is suitably supported (although bumper loops 17 in that Figure are generally not fully deformed so as to begin passing substantial portions of the load due to contact between structures 26 and 27 to the fender base).

Figure 4:
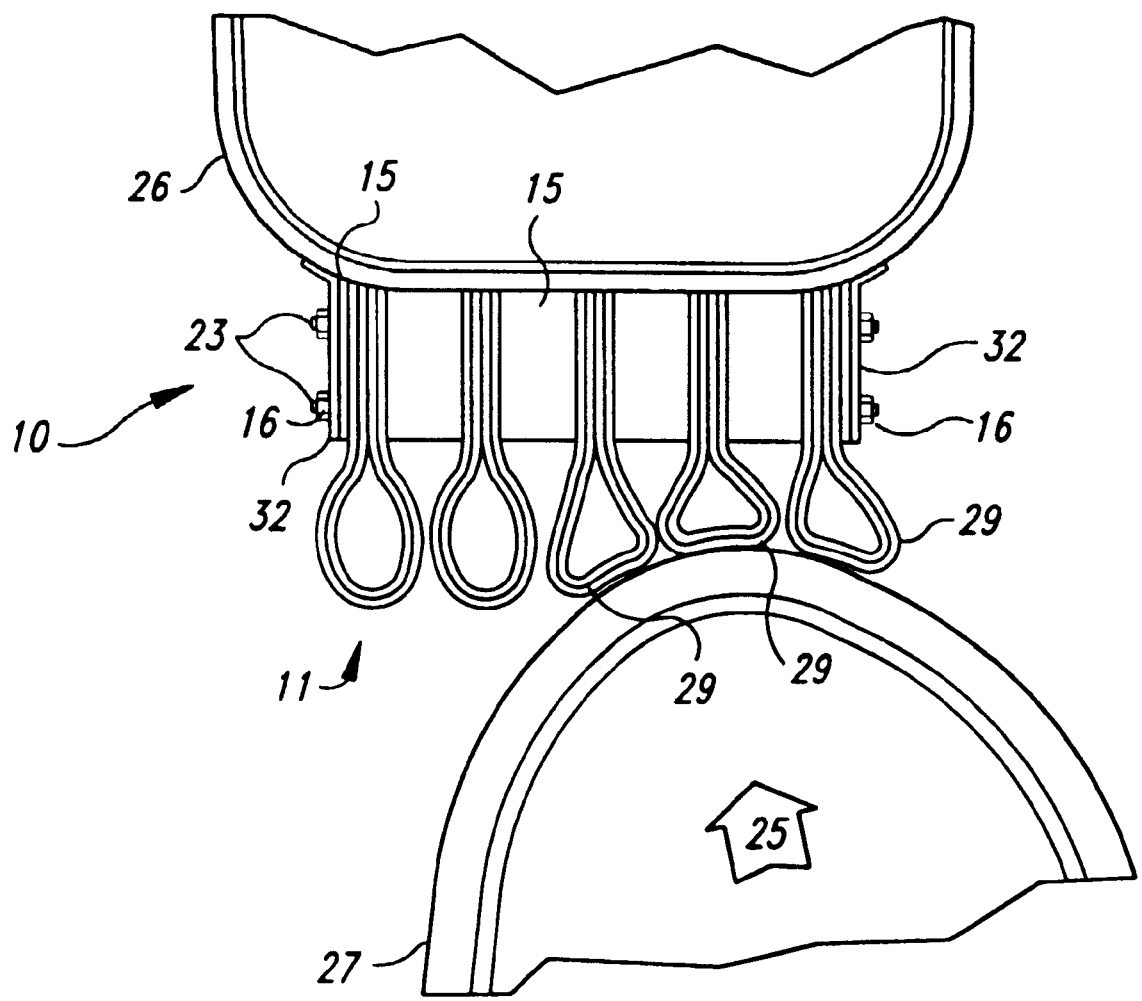
FIG. 4 is a schematic top view of an embodiment of the fender invention in use.

FIG. 4 is a schematic top view of an embodiment of the fender aspect of the invention. Fender 10 has been installed by welding hangers 32 to structure 26 to elastically intercede during contact between structure 26 and structure 27. Structures 26 and 27 might be any two structures which it might be desired to protect during contact or collision with each other. Structure 27 is depicted moving in the direction of arrow 25 and has moved into contact with fender 10, and in particular bumper loops 29 of fender 10, which have partially deformed as a result of the initial contact with structure 27, and have absorbed some of the energy of the impact of the structure, thus dissipating energy which might otherwise have been expended in deforming or damaging structures 26 or 27, or both. If spacers 15 shown in the Figure are made of an elastic, energy absorbent material, as for instance the same material used to fabricate bumper loops 29, then they will act in cooperation with the bumper loops in dissipating the energy of the collision in the event sufficient energy is available to fully deform the bumper loops so that they begin to impinge upon the spacers, and thus will serve to help protect the structures from further deformation or damage.

Figure 5A:
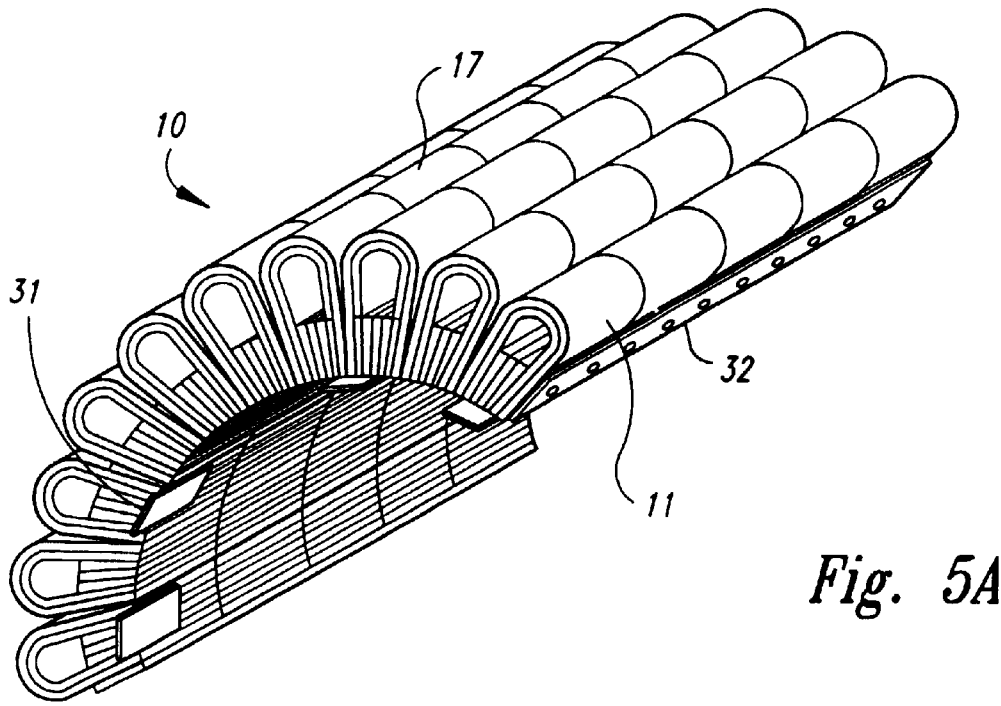
FIGS. 5a and 5b are perspective side views of alternate embodiments of the fender aspect of the invention.
Figure 5B:
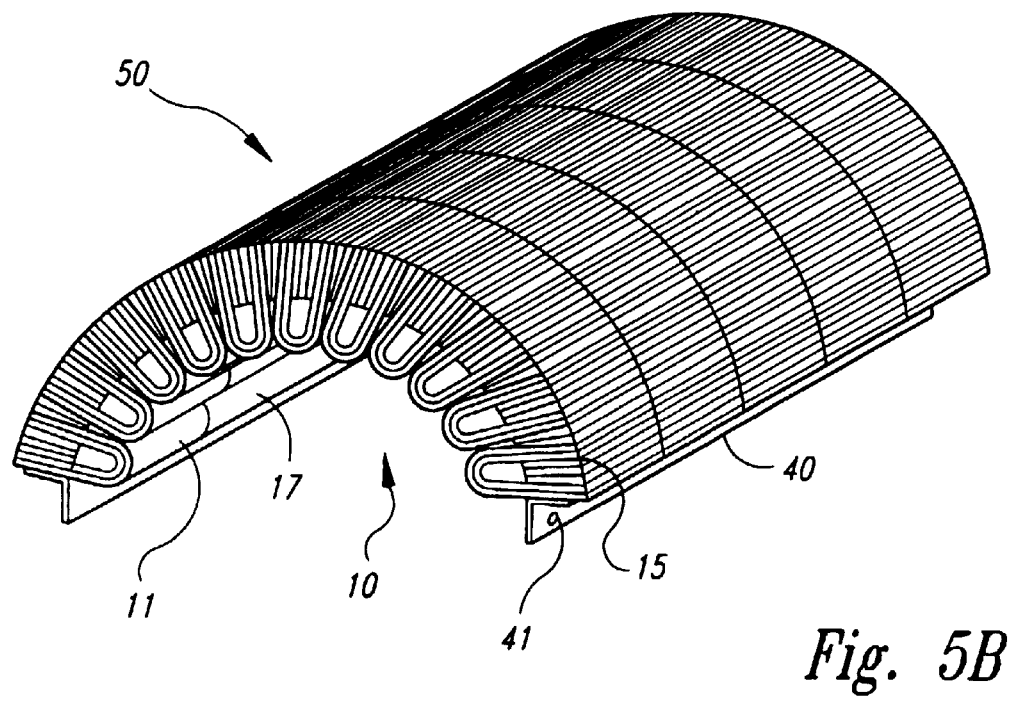

FIGS. 5a and 5b are perspective side views of embodiments of the fender aspect of the invention. In FIG. 5a fender 10, which is comprised of multiple rows or banks of bumpers 11 (which might alternatively be described as individual fenders 10 in their own right), fashioned as described above and joined by plates 32, through holes in which binder rods 23 have passed, to be capped by bolts 16, is prepared for mounting upon a structure such as a tugboat by means of hangers 31, which are generally welded directly to the hull of a tugboat or barge. In such configurations fender 10 is typically mounted so that it fits snugly against the structure upon which it is mounted in position to elastically intercede in an anticipated collision between the structure and some other structure or object, with bumper loops 17 oriented outward, away from the parent structure, as depicted in FIG. 4.

In FIG. 5b an alternate embodiment of the fender aspect of the invention, again comprised of multiple rows or banks of bumpers 11, is joined by angles 40. In this embodiment bumper loops 17 are oriented inward, toward the parent structure, so that a contacting object will first contact fender base 50, causing bumper loops 17 to deform first against the parent structure. Fender 10 is mounted upon the parent structure by passing chains or cables through holes 41 in angle plates 40 and securing them to the parent structure (see FIG. 8) such that bumper loops 17 are placed generally in contact with the parent structure. It is sometimes convenient in preparing either of the mountings in FIG. 5 to provide fender 10 with a shelf structure (not shown), or other fender, under the bottom side of the lowermost row in the fender, so as to provide additional support to the fender. Also shown in both FIGS. 5a and 5b is an alternative arrangement wherein spacers 15 are included between the loop ends of individual bumpers 11.

Figure 6:
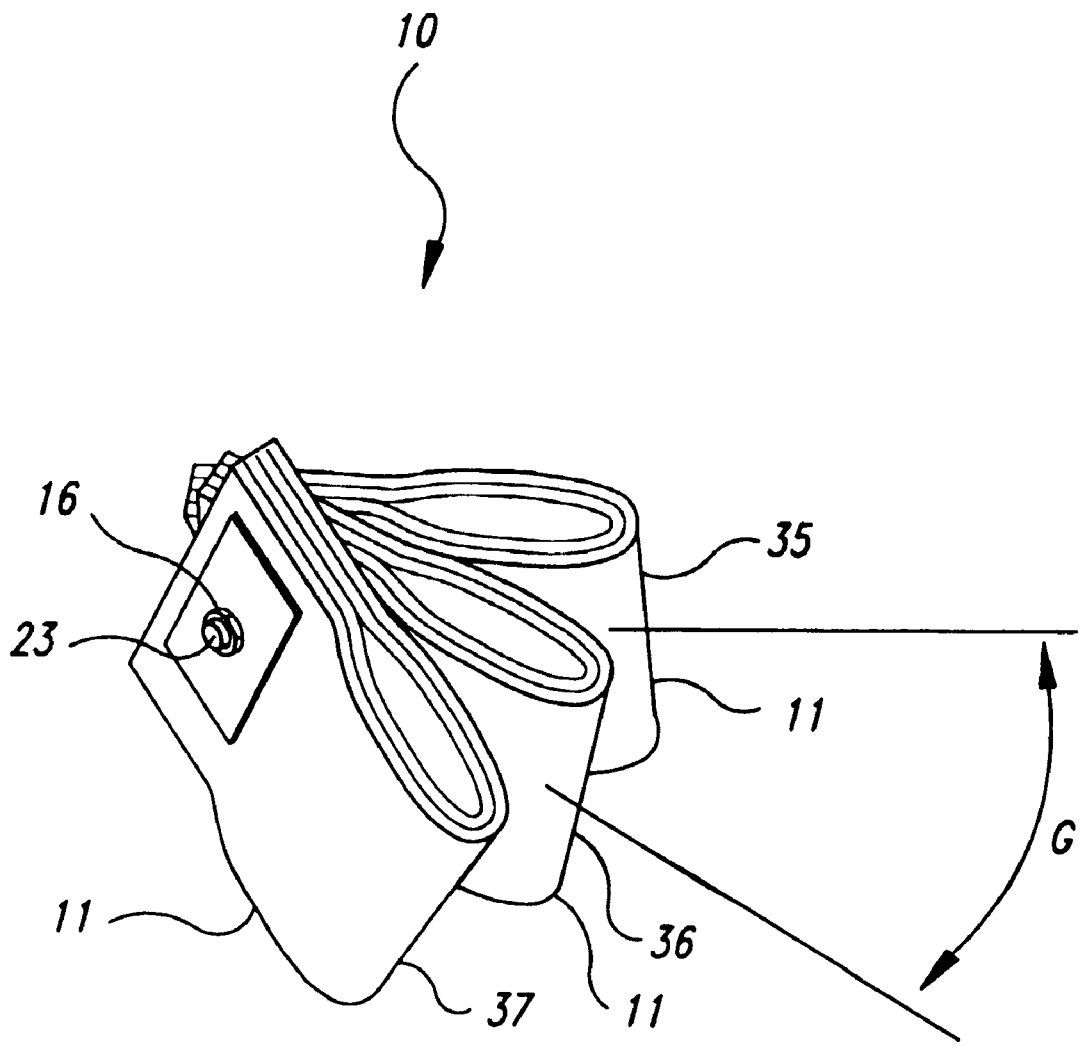
FIG. 6 is a perspective side view of an alternate embodiment of the fender aspect of the invention.

FIG. 6 is a perspective side view of an embodiment of the fender aspect of the invention. Fender 10 is depicted as comprised of several bumpers 11, separated by spacers 15 and fastened by binder rod 23 (not shown) and retainer nuts 16. With respect to bumper loop 36, bumper loop 35 has been given an upward orientation while bumper loop 37 has been given a downward orientation. Utilization of varying orientations among the bumper loops will enable a fender so made to protect a structure or object from contacts or forces imparted from a wide variety of directions. For any given application, the selection of suitable orientations will be a matter well within the ability of the ordinarily skilled fender designer. In a fender in which angle G between bumpers 35 and 36 were extended to approximate 180 degrees, bumpers 35 and 36 would be said to be oppositely opposed. Thus oppositely opposed bumpers might be expected to more or less equally share loads applied to a single fender from opposite directions.

Figure 7:
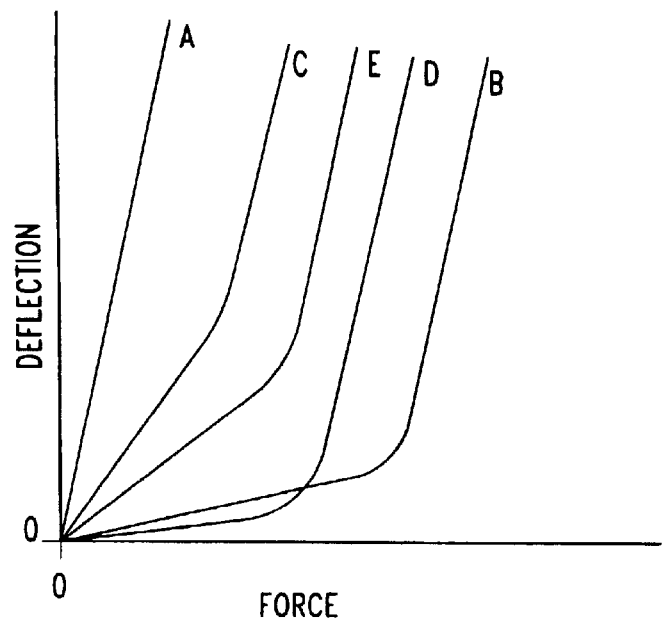
FIG. 7 is a qualitative chart of stiffness characteristics of various fender structures (A–E).
Figure 7:
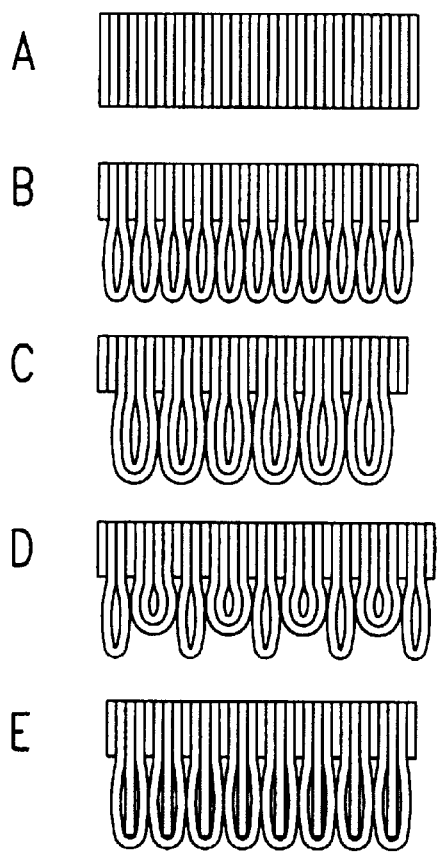

FIG. 7 is a qualitative chart of comparative stiffness characteristics of various fender arrangements fabricated from similar materials. The vertical axis of the chart denotes displacement of the bumper loop tip (or edge) of various types of bumper under direct compressive load against the outer surface of the bumper. Thus, as will be appreciated by those skilled in the art, the slopes of the various curves shown represent the stiffnesses of the various fenders under load.

For a fender such as that shown in FIG. 1 of U.S. Pat. No. 3,063,399, a relatively steep curve such as that shown by Curve A results, reflecting the relatively high stiffness of the fender's bumpers. For a single loop configuration a relatively soft curve, such as that shown by Curve B, results. The greater stiffness of multi-ply or laminated bumper loops according to the invention, which is still markedly (and tailorably or selectably) smaller than that of the Curve A fender, results for that configuration in a Curve such as Curve C, which is generally intermediate to Curves A and B. Curve D, which represents the stiffness of a fender comprising loops of both varying size and numbers of laminae, a variably-steep curve results, as a reflection of the variable stiffness of such a fender. For purposes of illustration, Curve D has arbitrarily been placed between Curves B and C in the Figure. For fenders of any given material, such a configuration could, however, be given virtually any stiffness by varying the size or thickness of the loops and laminae. For example, the stiffness of a fender consisting of very short, thick loops would approach that of Curve A, while that of a fender of long, thin loops would more nearly approach that of Curve B. The stiffness of fenders made of loops incorporating unfolded laminae will likewise vary arbitrarily; the location of Curve E has also been arbitrarily placed.

Figure 8A:
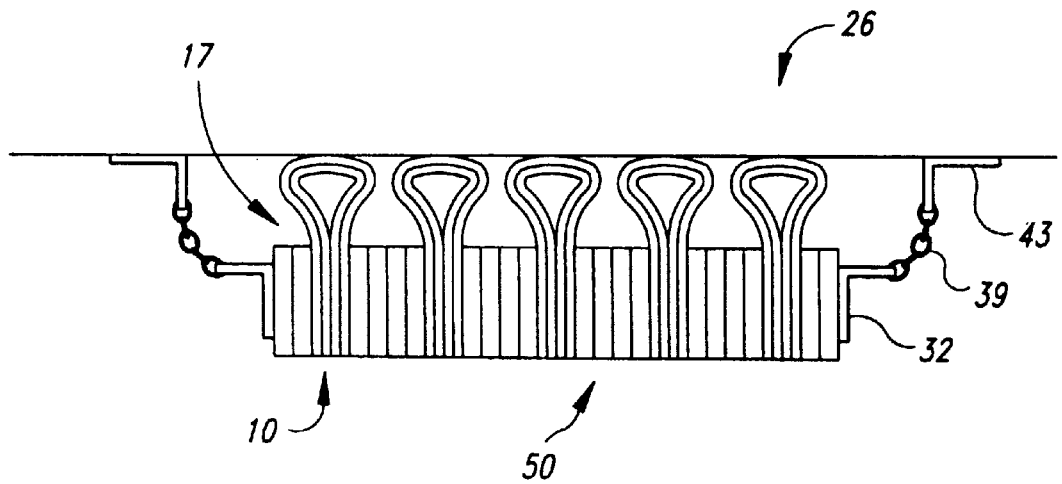
FIGS. 8a and 8b are schematic top and side views respectively of a floating mounting system for the invention.
Figure 8B:
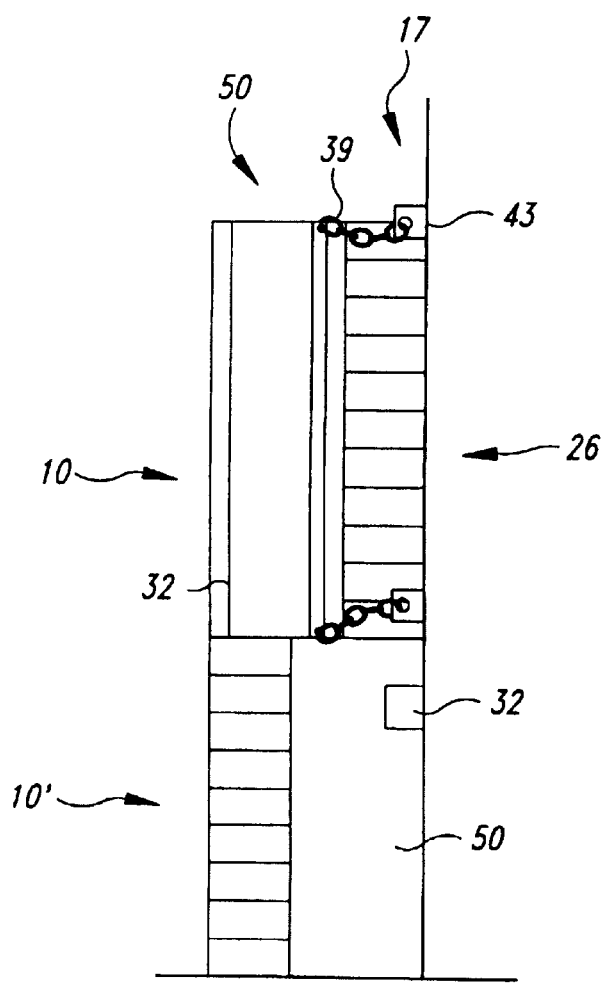

FIGS. 8a and 8b illustrate floating attachment of the alternate "bumper loops inward" configuration. A fender unit has its bumper loops 17 facing structure 26 to which the fender is to be attached, and fender base 50 facing outward for contact with other structures. In order that contact by other structures will preferentially and initially deform bumper loops 17 against parent structure 26, it is necessary for the attachment of fender 10 to "float" the fender against the structure in a relatively fixed fashion, while allowing forces impinging fender base 50 to translate into deformation of bumper loops 17. To that purpose, angle hanger 32 is chain connected to chain hanger 43 which is welded to structure 26. The length of chain 39 and the tension in it are set so that bumpers loops are all substantially in contact with structure 26, with only minimal deformation of the loops. Generally, this connection operation is carried out while the fender 10 is elevated in position with a crane. Thus the mounting of fender 10 "floats" to the extent needed to allow further deformation of loops 17, while at the same time not allowing any substantial movement of the fender when it is not in collision with another structure.

Other flexible connecting materials may be substituted for chain 39, such as cable and the like, as will appreciated by those skilled in the art. Optionally, a second rigidly mounted fender 10', or a shelf (not shown) may be positioned under fender 10 to provide additional vertical support, and to relieve chain 39 of most if not all of its vertical support duties.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTIRALL APPLICABILITY

The invention provides an extremely adaptable structural fender well suited to a number of applications, particularly in the field of heavy transportation. It is especially beneficial in that it is readily adapted to the use of large amounts of recycled, non-biodegradable materials. The invention provides laminated loop dampening and shield structures for both fixed and movable structures such as tugboats, other ships, trucks, loading docks, parking garages, piers, offshore drilling rigs, mooring dolphins, lock walls and mitre gates, and other objects and structures prone to contact or collision with or by other structures, and means for abating damage that might otherwise be sustained by such objects in collision, including a dampening or shield structure, or fender, that has selectable overall elastic or dampening and durability characteristics, and is simple, inexpensive, and highly adaptable.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A fender comprising a plurality of bumpers, a plurality of the bumpers each further comprising a plurality of elastic laminae, wherein at least one of the lamina is folded to enclose at least one other lamina, whereby the laminae form a laminated loop, each loop having a bumper loop portion and a loop end portion, each loop restrained at its loop end in a fender base.

2. The fender of claim 1, wherein at least one of the lamina is folded upon itself such that inner surfaces of the lamina come into contact with each other in the loop end.

3. The fender of claim 1, wherein the respective loop ends are restrained in the fender base between spacers.

4. The fender of claim 1, wherein the bumper loops project beyond the fender base and adjacent loops are spaced such that some bumper loops are in contact with each other when these bumpers loops are unloaded.

5. The fender of claim 1, wherein at least one bumper loop comprises at least one lamina that is not folded.

6. The fender of claim 5, wherein a bumper end of the lamina not folded is in substantial contact with an inner surface of a folded lamina.

7. The fender of claim 1, wherein at least one bumper loop comprises a plurality of adjacent laminae, wherein all laminae are substantially the same length and are folded together into a laminated loop wherein each lamina is substantially entirely in contact with its adjacent lamina.

8. The fender of claim 1, wherein the number of laminae comprising the laminated loops varies amongst the bumpers.

9. The fender of claim 8, wherein at least one bumper comprises a single-ply bumper loop.

10. The fender of claim 1, wherein some bumper loops are differentially oriented from other bumper loops.

11. The fender of claim 10, wherein some of the bumper loops are disposed oppositely to other bumper loops.

* * * * *